United States Patent
Lin

(10) Patent No.: US 9,338,615 B2
(45) Date of Patent: May 10, 2016

(54) METHOD FOR REPORTING SHORT MESSAGE STATUS AND SIGNALING INTERWORKING GATEWAY

(75) Inventor: Lang Lin, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 374 days.

(21) Appl. No.: 13/702,953

(22) PCT Filed: Aug. 18, 2010

(86) PCT No.: PCT/CN2010/076115
§ 371 (c)(1),
(2), (4) Date: Dec. 7, 2012

(87) PCT Pub. No.: WO2011/153732
PCT Pub. Date: Dec. 15, 2011

(65) Prior Publication Data
US 2013/0079044 A1    Mar. 28, 2013

(30) Foreign Application Priority Data

Jun. 8, 2010  (CN) .......................... 2010 1 0199056

(51) Int. Cl.
*H04W 4/14*    (2009.01)
*H04L 12/58*   (2006.01)
*H04W 8/26*    (2009.01)
(Continued)

(52) U.S. Cl.
CPC ............. *H04W 4/14* (2013.01); *H04L 12/5895* (2013.01); *H04L 51/38* (2013.01); *H04W 8/12* (2013.01); *H04W 8/26* (2013.01); *H04W 88/184* (2013.01)

(58) Field of Classification Search
CPC ....... H04W 4/14; H04W 88/184; H04W 8/12; H04W 8/26; H04L 12/5895; H04L 51/38

USPC ............................. 455/466, 445, 560, 414.1
See application file for complete search history.

(56) References Cited

U.S. PATENT DOCUMENTS 6,208,870 B1 * 3/2001 Lorello et al. ................. 455/466
7,269,431 B1 * 9/2007 Gilbert ........................... 455/466
(Continued)

FOREIGN PATENT DOCUMENTS

CN    101106754 A    1/2008
CN    101212709 A    7/2008
(Continued)

OTHER PUBLICATIONS

International Search Report (Form PCT/ISA/210) for PCT/CN2010/076115, mailed Mar. 17, 2011.

*Primary Examiner* — Marcos Torres
(74) *Attorney, Agent, or Firm* — Koppel, Patrick, Heybl & Philpott

(57) ABSTRACT

The disclosure claims a method for reporting short message status and a signaling interworking gateway. The method comprises: S102, signaling interworking gateway receives status report signaling transmitted from SMSC in source network, and forwards status report signaling to HLR in target network; S104, Hub receives status report response from the HLR, and stores corresponding relationship between first target user number and second target user number in the status report response; S106, the Hub receives notification signaling from the HLR; S108, the Hub takes the user number in the notification signaling as the second target user number, searches for the corresponding first target user number according to the corresponding relationship, replaces the user number in the notification signaling with the found first target user number, and sends the first target user number to the SMSC. The disclosure realizes the short message notification mechanism in roaming.

17 Claims, 6 Drawing Sheets

(51) Int. Cl.
*H04W 8/12* (2009.01)
*H04W 88/18* (2009.01)

(56) References Cited

U.S. PATENT DOCUMENTS

2007/0191011 A1* 8/2007 Jiang .............................. 455/436
2008/0207181 A1* 8/2008 Jiang ........................... 455/414.1
2009/0131087 A1* 5/2009 Johan ............................ 455/466
2010/0137011 A1 6/2010 Li et al.
2012/0203857 A1 8/2012 Wu et al.

FOREIGN PATENT DOCUMENTS

CN 101360267 A 2/2009
CN 101674554 A 3/2010

* cited by examiner

METHOD FOR REPORTING SHORT MESSAGE STATUS AND SIGNALING INTERWORKING GATEWAY

FIELD OF THE INVENTION

The disclosure relates to the communication field, and in particular to a method for reporting short message status and a signaling interworking gateway.

BACKGROUND OF THE INVENTION

Roaming and signaling interworking are the keys to the success of Global System for Mobile Communication (GSM). The GSM association has more than 600 operator members. Network interworking between two operators is usually realized through a bilateral protocol. With the arrival of 3G times, services become more diversified and there are endless new access technologies. Thus, it becomes harder and harder to meet the requirements of members by realizing the network interworking through bilateral protocol. Also, the cost on establishing the bilateral protocol presents an obstacle to develop new roaming service by some operators.

The status report mechanism of the GSM network (called G network for short) is a short message sending process for improving the performance of G network. If the process that a Short Message Service Center (SMSC) sends a short message to a user is failed (for example, the mobile phone of the user is turned off), it consumes a large amount of network resources to ensure that the short message is successfully sent to the user terminal just by a retry mechanism of the SMSC. The principle of the notification mechanism is recording the user status flag, notifying the SMSC to cache the short message when the user is unreachable, and notifying the SMSC to send the short message when the user is reachable. The notification mechanism can greatly improve the performance of network, and is realized specifically by the following way.

The signaling involved in this mechanism comprises: status report (for example, Report Deliver Status (RDS)) signaling and notification signaling (for example, ALERT). When failing to send the Mobile Terminated (MT) short message, the SMSC sends the status report signaling to a Home Location Register (HLR) according to the failure condition to notify the HLR that the user is unreachable. After receiving the status report signaling, the HLR marks the user record to indicate the current status of user. When the user terminal can receive the short message once more (for example, after the user turns on the mobile phone), the HLR receives notification sent from a Visitor Location Register (VLR), and then transmits the notification signaling to the SMSC according to the user record to notify the SMSC that it can continue to send the stored short message.

However, when the user roams to other network or operator, the version of Multimedia Access Protocol (MAP) adopted by the current network or operator may be different from that adopted by the target network or operator. Thus, it is impossible to directly interact, and the current short message status notification mechanism cannot be realized.

SUMMARY OF THE INVENTION

The disclosure mainly provides a method for reporting short message status and a signaling interworking gateway, to at least solve the above problem.

According to an aspect of the disclosure, a method for reporting short message status is provided. The method comprises steps of: a signaling interworking gateway (Hub) receiving a status report signaling transmitted from a Short Message Service Center (SMSC) in a source network, and forwarding the status report signaling to a Home Location Register (HLR) in a target network; the Hub receiving a status report response from the HLR, and storing a corresponding relationship between a first target user number in the status report signaling and a second target user number in the status report response; the Hub receiving a notification signaling from the HLR; and the Hub taking a user number in the notification signaling as the second target user number, searching for the corresponding first target user number according to the corresponding relationship, replacing the user number in the notification signaling with the found first target user number, and sending the notification signaling to the SMSC.

Furthermore, after storing the corresponding relationship between the first target user number in the status report signaling and the second target user number in the status report response, the method further comprises: if the SMSC in the source network supports MAPv1, then the Hub deleting the second target user number in the status report response; if the SMSC in the source network supports MAPv2 or higher, then the Hub replacing the second target user number in the status report response with the first target user number in the status report signaling; and the Hub sending the status report response to the SMSC.

Furthermore, the Hub further replaces a number of SMSC in the status report response with the number of the SMSC in the source network.

Furthermore, the Hub further stores a corresponding relationship between the number of the SMSC in the source network and the second target user number in the status report response; and the Hub searches for a number of SMSC corresponding to the user number in the notification signaling according to the corresponding relationship, and replaces a number of SMSC in the notification signaling with the found number of SMSC.

Furthermore, the Hub receiving the status report signaling transmitted from the SMSC in the source network, and forwarding the status report signaling to the HLR in the target network comprises: the Hub receiving the status report signaling transmitted from the SMSC in the source network; the Hub searching a local HLR routing table for the HLR in the target network corresponding to the target user number in the status report signaling; and the Hub forwarding the status report signaling to the HLR.

Furthermore, after replacing the user number in the notification signaling with the found first target user number and sending the notification signaling to the SMSC, the method further comprises: the SMSC in the source network searching for a short message of which the called user is the first target user number in the notification signaling; and sending the short message to the first target user number in the notification signaling.

Furthermore, sending the short message to the first target user number in the notification signaling comprises: the SMSC in the source network sending the short message to the Hub through a Mobile Terminated (MT) signaling; and the Hub querying the HLR in the target network for route, and forwarding the short message to the first target user number according to the route; or the SMSC in the source network querying an HLR in the source network for route, and sending the short message to the first target user number according to the route.

Furthermore, the Hub is a cascade of multiple Hubs.

According to another aspect of the disclosure, a signaling interworking gateway is provided. The signaling interworking gateway comprises: a first receiving module, configured to receive a status report signaling transmitted from a Short Message Service Center (SMSC) in a source network; a forwarding module, configured to forward the status report signaling to a Home Location Register (HLR) in a target network; a second receiving module, configured to receive a status report response from the HLR; a storing module, configured to store a corresponding relationship between a first target user number in the status report signaling and a second target user number in the status report response; a third receiving module, configured to receive a notification signaling from the HLR; a searching module, configured to take a user number in the notification signaling as the second target user number, and searching for the corresponding first target user number according to the corresponding relationship; a replacing module, configured to replace the user number in the notification signaling with the found first target user number; and a transmitting module, configured to transmitting the notification signaling to the SMSC.

Furthermore, a first processing module, configured to delete the second target user number in the status report response, in a condition that the SMSC in the source network supports MAPv1; a second processing module, configured to replace the second target user number in the status report response with the first target user number in the status report signaling, in a condition that the SMSC in the source network supports MAPv2 or higher; and a response sending module, configured to send the status report response to the SMSC.

Furthermore, a fourth receiving module, configured to receive a short message sent by the SMSC in the source network through a Mobile Terminated (MT) signaling; a route querying module, configured to query the HLR in the target network for route; and a short message forwarding module, configured to forward the short message to the first target user number according to the route.

With the disclosure, the signaling interworking gateway is introduced in the roaming notification process, and the corresponding relationship between the target user numbers in the status report signaling and in the status report response is stored. When the notification signaling is forwarded, the target user number in the notification signaling is replaced with the target user number in the stored status report signaling. This solution solves the problem in related technology that the short message status notification mechanism cannot be realized due to that different versions of MAP are adopted by networks. Also, the compatible processing of status report mechanism of different versions of MAP is realized on the basis of not changing the existing network architecture of operator, thereby realizing the short message notification mechanism in roaming.

BRIEF DESCRIPTION OF THE DRAWINGS

The drawings described herein are used for providing a further understanding of the disclosure, and constitute a part of the application. The schematic embodiments and specification of the disclosure are used for illustrating the disclosure and are not intended to form improper limit to the disclosure. In the drawings.

DETAILED DESCRIPTION OF THE EMBODIMENTS

The invention is described hereinafter in detail with reference to the drawings and embodiments. It should be noted that the embodiments and features in the embodiments in the application can be combined with each other.

Figure 1:
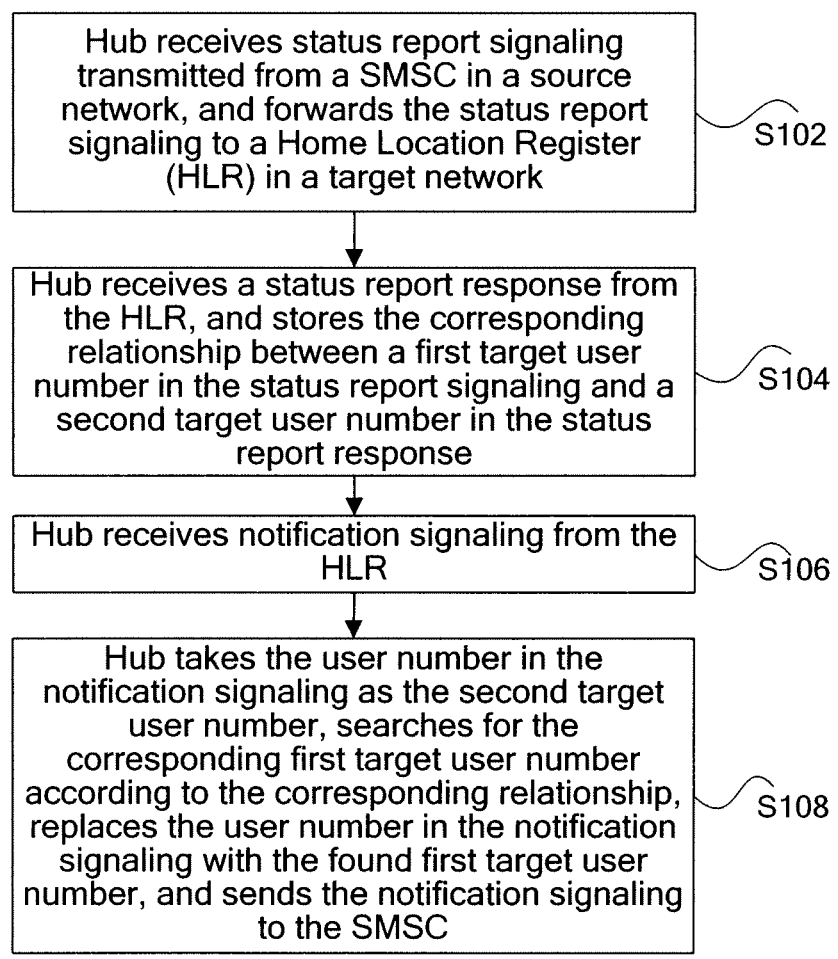
FIG. 1 shows a flowchart of a method for reporting short message status according to the embodiment of the disclosure.

FIG. 1 shows a flowchart of a method for reporting short message status according to the embodiment of the disclosure, comprising:

Step S102: the Hub receives the status report signaling transmitted from the SMSC in the source network, and forwards the status report signaling to the HLR in the target network;

Step S104: the Hub receives the status report response from the HLR, and stores the corresponding relationship between the first target user number in the status report signaling and the second target user number in the status report response;

Step S106: the Hub receives the notification signaling from the HLR; and

Step S108: the Hub takes the user number in the notification signaling as the second target user number, searches for the corresponding first target user number according to the corresponding relationship, replaces the user number in the notification signaling with the found first target user number, and sends the notification signaling to the SMSC.

In related technology, the versions of MAP supported by different networks may be different. The MAPv1 does not support one terminal with multiple numbers. But, the MAPv2 or higher supports one terminal with multiple numbers. In this case, in the HLR, only one number is taken as the identifier of the terminal. If the number in the status report signaling transmitted by the SMSC in the source network is not the number taken as the identifier, then the signaling from the HLR that contains the number taken as the identifier cannot be identified. Disorderliness of process may be caused. That is, the short message status report mechanism in roaming cannot be realized. In the method provided by the embodiment of the disclosure, the signaling interworking gateway is introduced in the roaming notification process, and the corresponding relationship between the target user numbers in the status report signaling and in the status report response is stored. Before the notification signaling is forwarded, the target user number in the notification signaling is replaced with the target user number in the stored status report signaling. This solution solves the problem in related technology that the short message status notification mechanism cannot be realized due to that different versions of MAP are adopted by networks. Also, the compatible processing of status report mechanism of different versions of MAP is realized on the basis of not changing the existing network architecture of operator, thereby realizing the short message notification mechanism in roaming.

Preferably, after Step S104, the method further comprises that: if the SMSC in the source network supports the MAPv1, then the Hub deletes the second target user number in the status report response; if the SMSC in the source network supports the MAPv2 or higher, then the Hub replaces the second target user number in the status report response with the first target user number in the status report signaling; and the Hub sends the status report response to the SMSC. Through this process, it can further realize the sending of the status report response, and each version of MAP in the SMSC can be taken into consideration. Thus, this method has strong adaptability.

Preferably, the Hub can also replace the number of SMSC in the status report response with the number of the SMSC in the source network. Thereby, the accuracy of data in the interacting of status report response signaling can be ensured. And this solution facilitates the subsequent authentication process.

Preferably, the Hub can also store the corresponding relationship between the number of the SMSC in the source network and the second target user number in the status report response; and the Hub can also search for the number of SMSC corresponding to the user number in the notification signaling according to the corresponding relationship, and replaces the number of SMSC in the notification signaling with the found number of SMSC. Thereby, the accuracy of data in the interworking notification signaling is ensured. And this solution facilitates the subsequent authentication process.

Preferably, Step S102 comprises that: the Hub receives the status report signaling transmitted from the SMSC in the source network; the Hub searches the local HLR routing table for the HLR in the target network corresponding to the target user number in the status report signaling; and the Hub forwards the status report signaling to the HLR. Setting the local HLR routing table in the Hub provides basis for forwarding the status report signaling. The processing efficiency of the Hub is improved by adopting the local routing table for searching.

Preferably, after Step S108, the method further comprises that: the Hub deletes the corresponding relationship. Because transmission of the notification signaling is completed and there is no need to search the corresponding relationship, the corresponding relationship can be deleted. Thereby, the storage space of the Hub is saved, and the operating efficiency of the Hub is improved.

Preferably, after Step S108, the method further comprises that: the SMSC in the source network searches for the short message of which the called user is the first target user number in the notification signaling; and the short message is sent to the first target user number in the notification signaling. Through the process, the process that the SMSC resends the short message to the user according to the notification signaling is completed without the need to retry repeatedly. Thereby the processing resource of the SMSC is saved.

Preferably, sending the short message to the first target user number in the notification signaling comprises that: the SMSC in the source network sends the short message to the Hub through the MT signaling; and the Hub queries the HLR in the target network for route, and forwards the short message to the first target user number according to the route; or the SMSC in the source network queries the HLR in the source network for route, and sends the short message to the first target user number according to the route.

In the above first method, the Hub forwards the short message, and the SMSC is not needed to search route, so that the processing of the SMSC is simplified. In the second method, the SMSC queries the HLR for route and then sends it, which lightens the processing load of the Hub.

Preferably, the Hub can be a cascade of multiple Hubs. Through the cascade of Hubs, the condition that there are one or more networks between the source network and the target network can be accommodated, and various network topology conditions can also be accommodated.

Figure 2:
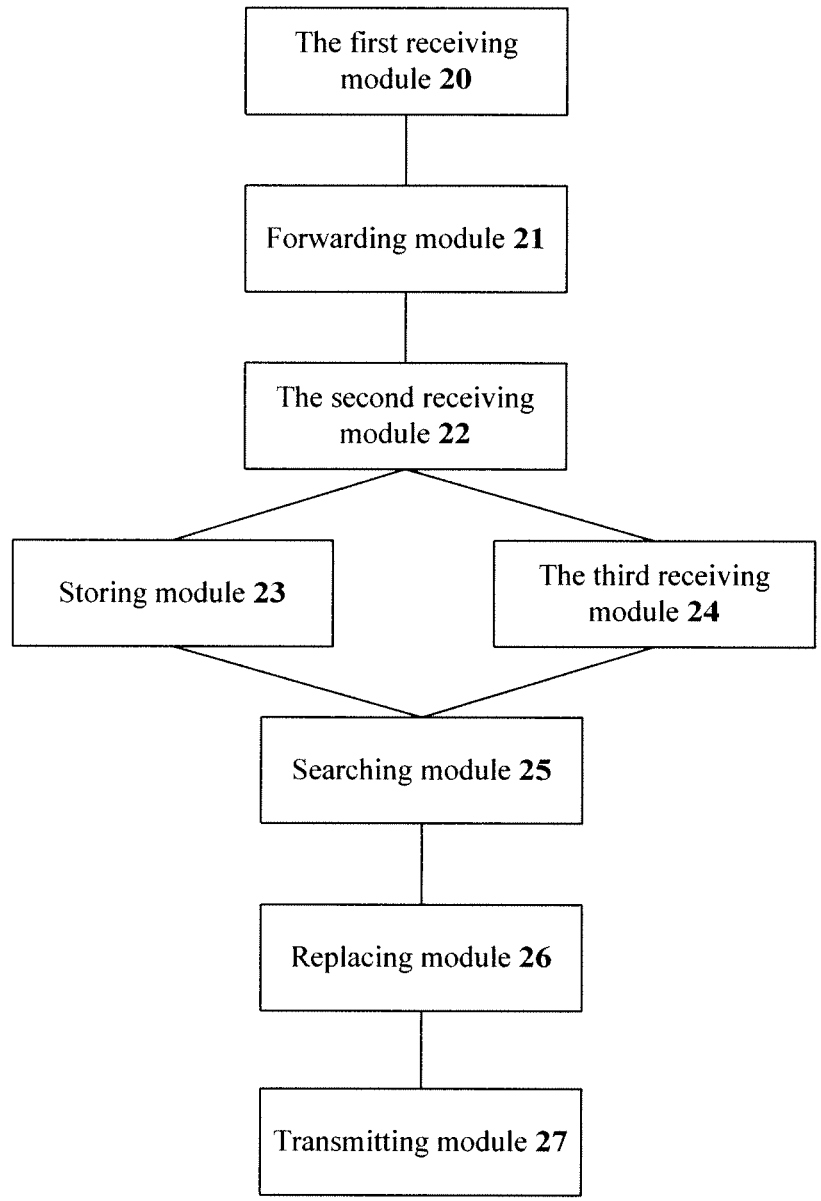
FIG. 2 shows a structural diagram of a signaling interworking gateway according to the embodiment of the disclosure.

FIG. 2 shows a structural diagram of a signaling interworking gateway according to the embodiment of the disclosure. The signaling interworking gateway comprises: a first receiving module 20, configured to receive the status report signaling transmitted from the SMSC in the source network; a forwarding module 21, which is coupled to the first receiving module 20 and configured to forward the status report signaling to the HLR in the target network; a second receiving module 22, which is coupled to the forwarding module 21 and configured to receive the status report response from the HLR; a storing module 23, which is coupled to the second receiving module 22 and configured to store the corresponding relationship between the first target user number in the status report signaling and the second target user number in the status report response; a third receiving module 24, which is coupled to the second receiving module 22 and configured to receive the notification signaling from the HLR; a searching module 25, which is coupled to the storing module 23 and the third receiving module 24 and configured to take the user number in the notification signaling as the second target user number, and search for the corresponding first target user number according to the corresponding relationship; a replacing module 26, which is coupled to the searching module 25 and configured to replace the user number in the notification signaling with the found first target user number; and a transmitting module 27, which is coupled to the replacing module 26 and configured to transmit the notification signaling to the SMSC.

In the above, the signaling interworking gateway is introduced into the roaming notification process. The corresponding relationship between the target user number in the status report signaling and the target user number in the status report response is stored by the storing module 23. Before forwarding the notification signaling by the transmitting module 27, the target user number in the notification signaling is replaced with the target user number in the stored status report signaling by the replacing module 26. This solution solves the problem in related technology that the short message status notification mechanism cannot be realized due to that different versions of MAP are adopted by networks. Also, the compatible processing of status report mechanism adopting different versions of MAP is realized on the basis of not changing the existing network architecture of operator, thereby realizing the short message notification mechanism in roaming.

Figure 3:
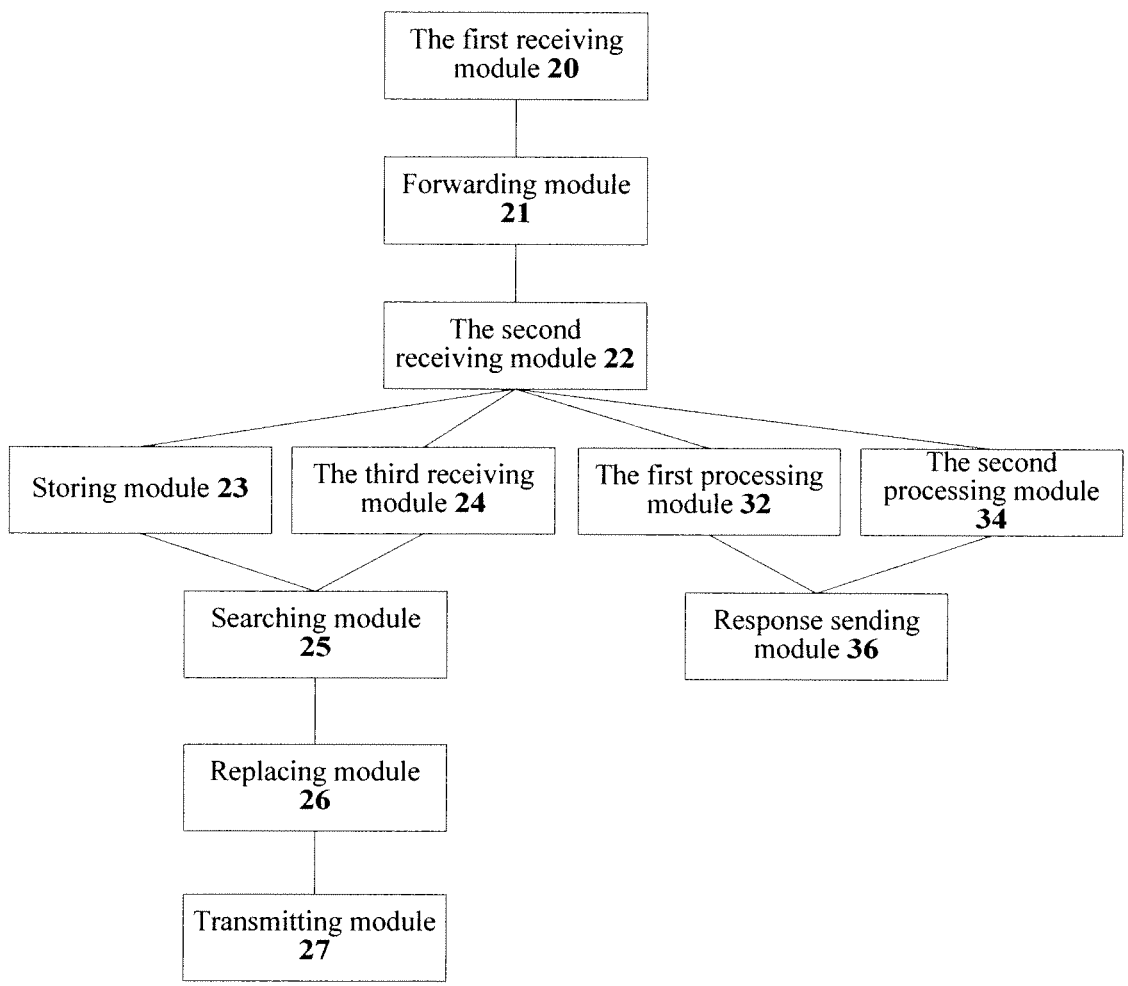
FIG. 3 shows the preferred structural diagram 1 of a signaling interworking gateway according to the embodiment of the disclosure.

FIG. 3 shows the preferred structural diagram 1 of a signaling interworking gateway according to the embodiment of the disclosure. As shown in FIG. 3, the signaling interworking gateway further comprises: a first processing module 32, which is coupled to the second receiving module 22 and configured to delete the second target user number in the status report response in a condition that the SMSC in the source network supports the MAPv1; a second processing module 34, which is coupled to the second receiving module 22 and configured to replace the second target user number in the status report response with the first target user number in the status report signaling in a condition that the SMSC in the source network supports the MAPv2 or higher; and a response sending module 36, which is coupled to the first processing module 32 and the second processing module 34 and configured to send the status report response to the SMSC.

Through the response sending module 36, sending of the status report response can be further realized. Through the cooperation of the first processing module 32 and the second processing module 34, each version of MAP in the SMSC can be taken into consideration. Thus, this method has strong adaptability.

Figure 4:
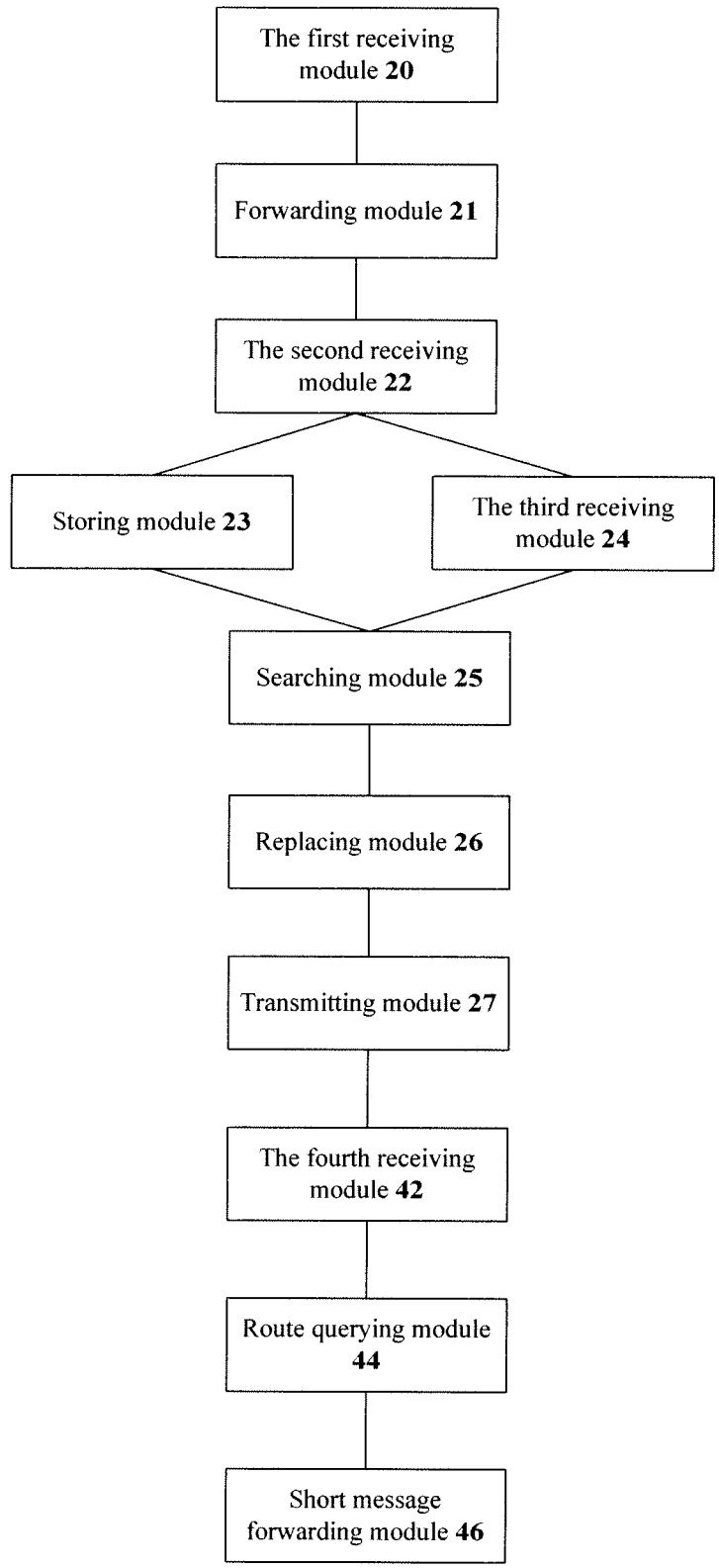
FIG. 4 shows the preferred structural diagram 2 of a signaling interworking gateway according to the embodiment of the disclosure.

FIG. 4 shows the preferred structural diagram 2 of a signaling interworking gateway according to the embodiment of the disclosure. As shown in FIG. 4, the signaling interworking gateway further comprises: a fourth receiving module 42, which is coupled to the transmitting module 27 and configured to receive the short message sent by the SMSC in the source network through the MT signaling; a route querying module 44, which is coupled to the fourth receiving module 42 and configured to query the HLR in the target network for route; and a short message forwarding module 46, which is coupled to the route querying module 44 and configured to forward the short message to the first target user number according to the route.

The embodiments 1 to 3 described below incorporate the technical solutions of multiple above-mentioned preferred embodiments.

Embodiment 1

The technical solution described in the embodiment enables the notification mechanism to be implemented across networks or operators by introducing the signaling gateway into the roaming notification process. The technical solution is: first establishing a cache to store the user MSISDN (R-MSISDN) and the number of SMSC (SC-GT) in the status report (for example, RDS) signaling, and the user MSISDN in RDS response (A-MSISDN); and later when forwarding the RDS response and notification signaling (for example, ALERT), taking the cached R-MSISDN as the MSISDN of user. With the technical solution, message can be processed correctly regardless whether the lower-level network element supports the MAPv2 or the MAPv1, and the subsequent process can be performed normally.

Figure 5:
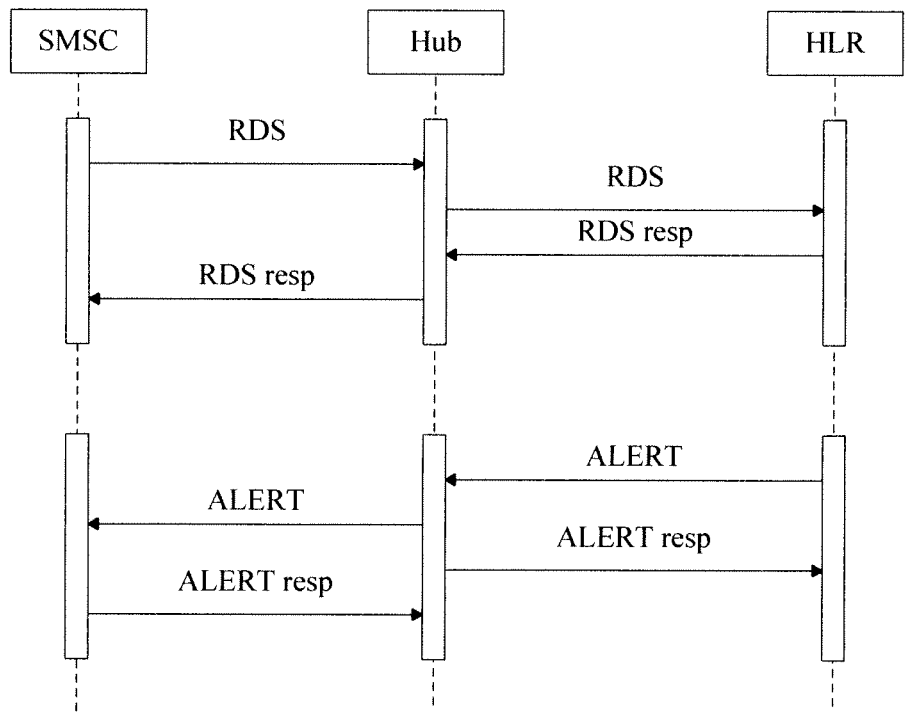
FIG. 5 shows a specific flowchart of a method for reporting short message status according to embodiment 1 of the disclosure.

The following description is based on the example that operator MON1 transmits the RDS signaling to the operator MON2, and the operator MON2 transmits the ALERT to the operator MON1. FIG. 5 shows a specific flowchart of a method for reporting short message status according to embodiment 1 of the disclosure. The method specifically comprises the following steps.

Step 1: the SMSC of the operator MON1 fails to send the short message to the user accessing the operator MON2.

Step 2: the signaling interworking gateway (Hub) receives the RDS signaling transmitted from the SMSC of the operator MON1 connected thereto.

Step 3: the Hub queries the local HLR routing table and finds that the user currently accesses the operator MON2, and then forwards the RDS signaling to the HLR of the operator MON2.

Step 4: the Hub receives the RDS response (noted as RDS resp) returned by the HLR of the operator MON2.

Step 5: the Hub replaces the user MSISDN number in the RDS response with the user MSISDN number in RDS request message (i.e., above-mentioned RDS signaling).

Figure 6:
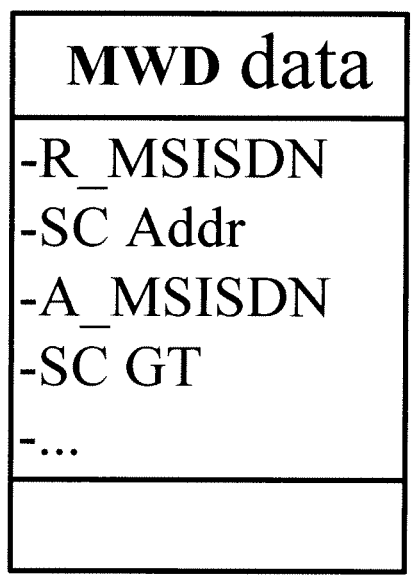
FIG. 6 shows a schematic diagram of internal data structure of the Hub according to embodiment 1 of the disclosure.

Specifically, FIG. 6 shows a schematic diagram of internal data structure of the Hub according to embodiment 1 of the disclosure. As shown in FIG. 6, the MSISDN number (also called source MSISDN below) and the number of SMSC in the RDS request message are recorded in the local Message Waiting Data (MWD) table, and the MSISDN in the RDS response message is recorded as index. Other information, such as user IMSI, can also be recorded.

Step 6: the Hub sends the RDS response to the SMSC of the operator MON1. If the SMSC supports the MAPv1, then the response message does not contain the MSISDN. If the SMSC supports the MAPv2 or higher version, then the MSISDN in the request message is contained.

Step 7: the user of operator MON2 is reachable again. For example, the mobile phone is turned on, or the memory space of the mobile phone meets the conditions etc.

Step 8: the Hub receives the ALERT transmitted by the HLR of operator MON2. Step 9: the Hub queries, according to the MSISDN in the ALERT, the MWD table by index to obtain the source MSISDN number and the number of SMSC, based on which the Hub constructs a new ALERT and then forwards the new ALERT to the SMSC of operator MON1, and then the Hub deletes the MWD data.

Step 10: the SMSC of operator MON1 receives the ALERT, searches for the cached short message of which the called user is the user of the user MSISDN in the ALERT, and forwards the short message to the Hub through the MT signaling.

Step 11: the Hub receives the MT signaling transmitted from the SMSC of operator MON1, and forwards, after routing, the MT signaling to a mobile switching center where the user is.

Through the above process, on the basis of not changing the existing network architecture of operator, the roaming short message status report mechanism across operators and networks is realized by adding the signaling interworking gateway. Regarding the case that networks of operators adopt different versions of MAP protocols, the technical solution can realize compatibility between them.

Embodiment 2

The embodiment describes a preferred process of the method for reporting short message status, comprising the following steps.

Step 1: a static routing table is constructed on the signaling interworking gateway (Hub), so as to realize the function of searching for the target HLR address according to the target MSISDN number.

Step 2: the Hub receives the RDS signaling of the operator MON1 that the Hub belongs to.

Step 3: the Hub queries to know that the route is directed to the operator MON2, and forwards the RDS signaling to the HLR of the operator MON2.

Step 4: the Hub receives the RDS response returned by the HLR.

Step 5: according to the RDS request message and the RDS response message, the MWD record is generated and then stored, wherein the record comprises the user MSISDN in the request message, the number of SMSC in the request message, the address of SMSC in the request message, the user MSISDN in the response message (if exists) etc.

Step 6: replacing the number of SMSC in the response message with the number of SMSC in the request message. If the protocol of the source SMSC is the MAPv2, then it is further needed to replace the MSISDN in the response message with the MSISDN in the request message, and to forward the response message to the source SMSC.

Step 7: the Hub receives the ALERT request from the HLR of operator MON2.

Step 8: searching the MDW for record according to the MSISDN in the request, constructing a new ALERT request according to the request MSISDN and the number of SMSC in the record, and sending the request to the source SMSC.

Step 9: the source SMSC receives the ALERT request, and searches for the cached short message of which the called user is the user of the user MSISDN in the request. Then, the short message can be sent after querying the HLR for route or can be directly sent to the Hub through the MT signaling.

Step 10: the Hub receives the MT signaling transmitted from the SMSC of operator MON1, queries the HLR of operator MON2 for route, and then forwards the MT signaling to the mobile switching center where the user is.

Embodiment 3

Figure 7:
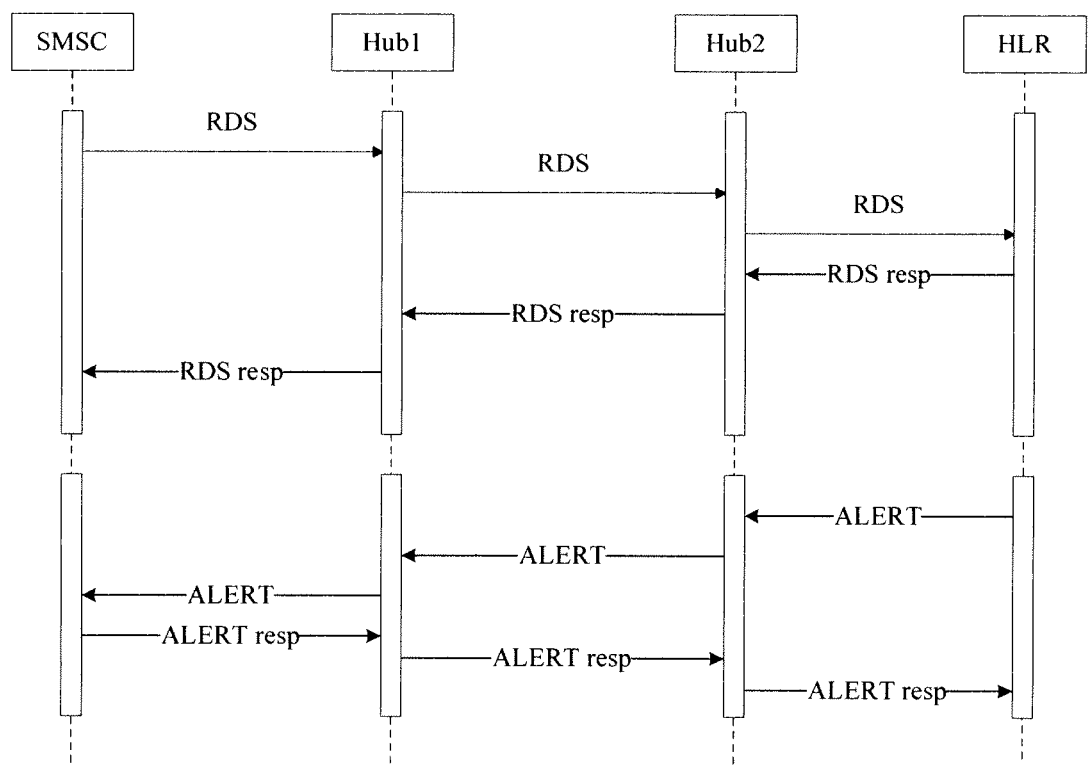
FIG. 7 shows a specific flowchart of a method for reporting short message status according to embodiment 3 of the disclosure.

The embodiment describes a preferred process of the method for reporting short message status in the condition that there are one or more networks between the source network and the target network. FIG. 7 shows a specific flowchart of a method for reporting short message status according to embodiment 3 of the disclosure, comprising the following steps.

Step 1: static routing tables are constructed on the signaling interworking gateway Hub1 and Hub2, so as to realize the function of searching for the target HLR address according to the target MSISDN number.

Step 2: Hub1 receives the RDS signaling of the operator MON1 that Hub1 belongs to.

Step 3: Hub1 queries to know that the route is directed to the operator MON2, and forwards the RDS signaling to Hub2 of the operator MON2.

Step 4: Hub2 queries to know that the route is directed to the operator MON3, and forwards the RDS signaling to the HLR of the operator MON3.

Step 5: Hub2 receives the RDS response returned by the HLR of operator MON3.

Step 6: Hub2 forwards the RDS to Hub1. Hub1 generates and then stores the MWD record according to the RDS request message and the RDS response message, wherein the record comprises the user MSISDN in the request message, the number of SMSC in the request message, the address of SMSC in the request message, the user MSISDN in the response message (if exists) etc.

Step 7: replacing the number of SMSC in the response message with the number of SMSC in the request message. If the protocol of the source SMSC is the MAPv2, then it is further needed to replace the MSISDN in the response message with the MSISDN in the request message, and to forward the response message to the source SMSC of operator MON1.

Step 8: Hub2 receives the ALERT request from the HLR of operator MON3. Step 9: Hub2 forwards the ALERT request to Hub1. Hub1 searches the MOW for record according to the MSISDN in the request, constructs a new ALERT request according to the request MSISDN and the number of SMSC in the record, and then sends the new ALERT request to the source SMSC.

In the technical solution provided by the embodiment of the disclosure, the operator MON1 transmits the RDS signaling to the operator MON2, and the operator MON2 transmits the ALERT to the operator MON1. The Hub adopts logic of the MAPv1 when recording the MWD, and realizes forwarding of the ALERT according to the recorded MWD, instead of directly transmitting the source ALERT. Thus, the solution is compatible with the protocols of MAPv1 and MAPv2 or higher, and the roaming short message status report can be realized. Moreover, the roaming short message notification mechanism across networks is realized on the basis of not changing the existing network architecture of operator.

Obviously, those skilled in the art should appreciate that above-mentioned modules and steps of the disclosure can be realized by a general-purpose computer. They can be centralized in single computing device or distributed on a network composed of multiple computing devices. Optionally, they can be realized by program code which is capable of being executed by the computing device, so that they can be stored in a storage device and executed by the computing device. In addition, under some conditions, the presented or described steps can be executed in an order different from that described here. Alternatively, they are made into integrated circuit modules respectively; or multiple modules and steps among them are made into single integrated circuit module to realize. In this way, the disclosure is not limited to any particular combination of hardware and software.

The above is only the preferred embodiments of the disclosure and is not intended to limit the disclosure. For those skilled in the art, the disclosure may have various modifications and changes. Any modifications, equivalent replacements, improvements and the like within the spirit and principle of the disclosure shall fall within the scope of protection of the disclosure.

What is claimed is:

1. A method for reporting short message status, comprising steps of:
    a signaling interworking gateway (Hub) receiving a status report signaling transmitted from a Short Message Service Center (SMSC) in a source network, wherein a first target user number is carried in the status report signaling, and forwarding the status report signaling to a Home Location Register (HLR) in a target network, wherein the source network and the target network respectively adopt different versions of Multimedia Access Protocol (MAP);
    the Hub receiving a status report response from the HLR, wherein a second target user number is carried in the status report response, and storing an index relationship between the first target user number and the second target user number;
    the Hub receiving a notification signaling from the HLR, wherein the second target user number is carried in the notification signaling; and
    the Hub searching for the first target user number corresponding to the second target user number according to the index relationship, replacing the second target user number in the notification signaling with the found first target user number, and sending the notification signaling to the SMSC.

2. The method according to claim 1, after storing the associated relationship between the first target user number in the status report signaling and the second target user number in the status report response, further comprising:
    if the SMSC in the source network supports MAPv1, then the Hub deleting the second target user number in the status report response; if the SMSC in the source network supports MAPv2 or higher, then the Hub replacing the second target user number in the status report response with the first target user number in the status report signaling; and
    the Hub sending the status report response to the SMSC.

3. The method according to claim 2, wherein a number of SMSC is carried in the status report response, and the Hub further replaces the number of SMSC in the status report response with the number of the SMSC in the source network.

4. The method according to claim 2, wherein the Hub is a cascade of multiple Hubs.

5. The method according to claim 3, wherein the Hub is a cascade of multiple Hubs.

6. The method according to claim 1, wherein the Hub further stores a second associated relationship between the number of the SMSC in the source network and the second target user number in the status report response; and the Hub searches for a number of SMSC corresponding to the user number in the notification signaling according to the second associated relationship, and replaces a number of SMSC in the notification signaling with the found number of SMSC.

7. The method according to claim 6, wherein the Hub is a cascade of multiple Hubs.

8. The method according to claim 1, wherein the Hub receiving the status report signaling transmitted from the SMSC in the source network, and forwarding the status report signaling to the HLR in the target network comprises:

the Hub receiving the status report signaling transmitted from the SMSC in the source network;

the Hub searching a local HLR routing table for the HLR in the target network corresponding to the target user number in the status report signaling; and the Hub forwarding the status report signaling to the HLR.

9. The method according to claim 8, wherein the Hub is a cascade of multiple Hubs.

10. The method according to claim 1, after replacing the second target user number in the notification signaling with the found first target user number and sending the notification signaling to the SMSC, further comprising:

the SMSC in the source network searching for a short message of which a called user corresponding to the first target user number in the notification signaling; and sending the short message to the first target user number in the notification signaling.

11. The method according to claim 10, wherein sending the short message to the first target user number in the notification signaling comprises:

the SMSC in the source network sending the short message to the Hub through a Mobile Terminated (MT) signaling; and the Hub querying the HLR in the target network for route, and forwarding the short message to the first target user number according to the route; or the SMSC in the source network querying an HLR in the source network for route, and sending the short message to the first target user number according to the route.

12. The method according to claim 10, wherein the Hub is a cascade of multiple Hubs.

13. The method according to claim 11, wherein the Hub is a cascade of multiple Hubs.

14. The method according to claim 1, wherein the Hub is a cascade of multiple Hubs.

15. A signaling interworking gateway, comprising:

a first receiving module, configured to receive a status report signaling transmitted from a Short Message Service Center (SMSC) in a source network, wherein a first target user number is carried in the status report signaling;

a forwarding module, configured to forward the status report signaling to a Home Location Register (HLR) in a target network, wherein the source network and the target network respectively adopt different versions of Multimedia Access Protocol (MAP);

a second receiving module, configured to receive a status report response from the HLR, wherein the second target user number is carried in the status report response;

a storing module, configured to store an index relationship between the first target user number and the second target user number;

a third receiving module, configured to receive a notification signaling from the HLR, wherein the second target user number is carried in the notification signaling;

a searching module, configured to search for the first target user number corresponding to the second target user number according to the associated relationship;

a replacing module, configured to replace the second target user number in the notification signaling with the found first target user number; and a transmitting module, configured to transmitting the notification signaling to the SMSC.

16. The signaling interworking gateway according to claim 15, further comprising:

a first processing module, configured to delete the second target user number in the status report response, in a condition that the SMSC in the source network supports MAPv1;

a second processing module, configured to replace the second target user number in the status report response with the first target user number in the status report signaling, in a condition that the SMSC in the source network supports MAPv2 or higher; and a response sending module, configured to send the status report response to the SMSC.

17. The signaling interworking gateway according to claim 15, further comprising:

a fourth receiving module, configured to receive a short message sent by the SMSC in the source network through a Mobile Terminated (MT) signaling;

a route querying module, configured to query the HLR in the target network for route; and a short message forwarding module, configured to forward the short message to the first target user number according to the route.

* * * * *